Patented Oct. 21, 1952

2,615,003

UNITED STATES PATENT OFFICE 2,615,003

COMPOSITION COMPRISING A THERMO-SETTING RESIN AND A DIHYDROXY ALKANE CONTAINING 6-10 CARBON ATOMS

Tzeng Jiueq Suen and Arthur M. Schiller, Stamford, Conn., assignors to American Cyanamid Company, New York, N. Y., a corporation of Maine No Drawing. Application October 6, 1951, Serial No. 250,189

6 Claims. (Cl. 260—33.4)

This invention relates to compositions of matter comprising thermosetting resins, such as the urea-formaldehyde resins and the melamine-formaldehyde resins, in admixture with a flow-promoter in the nature of a dihydroxy alkane which contains from 6-10 carbon atoms. Still further, this invention relates to compositions of matter which may be readily used as synthetic resinous molding compositions comprising urea-formaldehyde resins and melamine-formaldehyde resins which have been modified by the addition of a flow-promoter, such as dihydroxy alkanes containing from 6-10 carbon atoms.

The object of the present invention is to modify urea-formaldehyde resins and/or melamine formaldehyde resins by adding thereto a flow-promoter of the class dihydroxy alkanes containing from 6-10 carbon atoms. A further object of the present invention is to produce molding compositions comprising melamine-formaldehyde resins or urea-formaldehyde resins which have been modified by the flow-promoters of the class described wherein the shrinkage of the molded article is appreciably reduced by the virtue of the use of said flow-promoters. These, and other objects of the present invention, will be discussed more fully hereinbelow.

In order for a flow-promoter to be satisfactory for use with urea and melamine resins, it should be compatible with the resin, have a very low volatility so that it will not lose its effectiveness on aging and it should not lower the water resistance of the articles molded from the resins. We have discovered that the particular flow-promoters claimed hereinbelow are particularly suited for this purpose, because they possess the proper balance between the polar and non-polar groups necessary to insure good compatibility with the urea and melamine resins. Glycols with fewer carbon atoms appear to be too polar in nature and their volatility is too high. Glycols with more than ten carbon atoms become increasingly non-polar and their melting points are too high for the present purposes. It is necessary to maintain a proper balance between the number of hydroxy groups in the flow-promoter and the number of carbon atoms. The mono-hydroxy alkanes must have less than six carbon atoms in order to establish a balance and are then too volatile. The polyhydroxy alkanes having three or more hydroxy groups require more than ten carbon atoms in order to establish a balance and then they have too high a melting point.

In the preparation of the compositions of the present invention, one may use the urea-formaldehyde resins, wherein the mol ratio of the urea to formaldehyde is within the range of 1:1–1:4, but preferably those which are within the range of 1:1.2–1:2, respectively. In the use of the melamine-formaldehyde resins, one may make use of mol ratios of melamine to formaldehyde within the range of 1:1–1:6, respectively, but preferably within the range of 1:1.5–1:3.

The flow-promoters which may be used to modify the thermosetting resins to produce the compositions of the present invention are dihydroxy alkanes containing between 6-10 carbon atoms, but preferably those containing 7-9 carbon atoms. The flow-promoter which produces optimum results is an octylene glycol, or more specifically, 2-ethyl hexanediol-1,3.

In order that the present invention may be more completely understood, the following examples are set forth, in which all parts are parts by weight. In these examples, it should be remembered that specific enumeration of detail is set forth solely for the purpose of illustration, and should not be interpreted as limitations on the case, except as indicated in the appended claims.

EXAMPLE 1

To an S-bladed mixer there is added 40 parts of Solka-Fil 400 (wood flour) and 1 part of zinc stearate, and the components are mixed for about 10 minutes. Thereafter, there is added to the mixture 58 parts of a melamine-formaldehyde resin powder (mol ratio of melamine to formaldehyde being 1:2) and 0.25 part of magnesium oxide and mixed for 10 minutes. To this mixture there is then added 2 parts of 2-ethyl hexanediol-1,3 at a comparatively slow rate and the entire mixture is mixed for 10 minutes. Thereafter, 25 parts of water are added slowly and the mass is mixed for about 20 minutes at 20–25° C. in order to densify the mixture. The mixture is then dried in an oven with hot air at a temperature of about 170° F. until a volatile content of 4.3% (determined by drying at 135° C. for 20 minutes) is reached. Its plasticity as measured by a "Flow-Mold-Flow" method is 0.042 in. The resinous product is then granulated.

EXAMPLE 2

A melamine resin molding compound is prepared in the same manner as that described in Example 1, in which the following components are used.

| | Parts |
|---|---|
| Melamine-formaldehyde resin powder (mol ratio 1:2, respectively) | 55 |
| Wood flour (Solka-Fil 400) | 40 |
| Zinc stearate | 1 |
| Magnesium oxide | 0.25 |
| Water | 25 |
| 2-ethyl hexanediol-1,3 | 5 |

The plasticity of the product is about the same as that in Example 1.

EXAMPLE 3

A melamine resin molding composition is prepared by the same procedure as described in Example 1, except that the resin constituted 60 parts and the addition of the flow-promoter is omitted. The plasticity of the product is about the same as that in Example 1.

EXAMPLE 4

A melamine resin molding composition is prepared by the same procedure as described in Example 1, except that the addition of the flow-promoter and the water are combined, in which a solution of 5 parts of hexanediol-2,5 in 25 parts of water is added.

The following components comprise the list of ingredients used:

| | Parts |
|---|---|
| Melamine-formaldehyde resin powder (mol ratio 1:2) | 55 |
| Wood flour (Solka-Fil 400) | 40 |
| Zinc stearate | 1 |
| Magnesium oxide | 0.25 |
| Water | 25 |
| Hexanediol-2,5 | 5 |

The molding compound thus prepared is evaluated for shrinkage, flexural strength (A. S. T. M.–D790) and water absorption (A. S. T. M.–D570). The determination of the shrinkage of the molded article is accomplished in the following manner: The shrinkage of the molded article is evaluated by means of a test piece in the form of a circular disc 1/8" thick and 4" in diameter and is measured in terms of "mold shrinkage" and "after shrinkage." If the diameter of the cold mold cavity is denoted as A; the diameter of the molded disc after being conditioned at 25° C. and at a relative humidity of 50% for 48 hours is denoted as B; and the diameter of the disc after further conditioning for 48 hours at 220° F. and thereafter being cooled to 25° C. at 50% relative humidity is denoted as C; the following equations can be set up in which the shrinkages are measured in terms of mils/inch:

$$\text{Mold shrinkage} = \frac{A-B}{A} \times 1000$$

$$\text{After shrinkage} = \frac{B-C}{A} \times 1000$$

$$\text{Total shrinkage} = \frac{A-C}{A} \times 1000$$

The test results produced on the resinous composition of Examples 1–4, inclusive, are set forth hereinbelow in Table I.

Table I

| Example | Volatile Content After 20 min. at 135° C. | Plasticity FMF [1] | Shrinkage | | | Flexural | | Water Absorption |
|---|---|---|---|---|---|---|---|---|
| | | | Mold | After | Total | Modulus of Rupture, p.s.i. | Deflection Mil | |
| 1 | 4.3 | 0.042 | 7.6 | 9.6 | 17.2 | 13,000 | 133 | 0.57 |
| 2 | 3.0 | 0.043 | 7.8 | 5.7 | 13.5 | 10,700 | 94 | 0.43 |
| 3 | 6.3 | 0.040 | 7.5 | 13.1 | 20.6 | 11,900 | 131 | 1.07 |
| 4 | 5.7 | 0.040 | 8.3 | 9.2 | 17.5 | 9,000 | 79 | 0.62 |

[1] FMF = Flow Mold Flow in inches.

EXAMPLE 5

A urea-formaldehyde resin syrup is made by conventional methods and at the end of the syrup reaction, 5% by weight based on the total weight of the dry resin solids and pulp mixture, of 2-ethyl hexanediol-1,3 is added to the syrup. The syrup is then mixed with a cellulosic filler and dried. The dried mixture is ground to a fine powder, blending in the catalyst and lubricant at the same time. A 4" molded disc of this composition has a total shrinkage of 8.2 mils per inch, as compared with 14.1 mils per inch for molding composition without a flow promoter of the class described and claimed herein.

In the modification of the compositions of the present invention, one may make use of a flow-promoter in the nature of a dihydroxy alkane which contains from 6–10 carbon atoms. Amongst those flow-promoters which may be used are hexanediol-1,6, hexanediol-1,5, hexanediol-1,4, hexanediol-3,4, hexanediol-1,2, hexanediol-2,5, hexanediol-2,4, hexanediol-2,3, heptanediol-1,7, heptanediol-1,5, heptanediol-1,4, heptanediol-1,2, heptanediol-2,6, heptanediol-2,5, heptanediol-3,4, octanediol-1,8, octanediol-2,7, octanediol-1,6, octanediol-4,5, nonanediol-1,9, nonanediol-1,5, nonanediol-4,5, and decanediol-1,10, decanediol-3,8, decanediol-4,7, decanediol-1,5, decanediol-1,2, 2-methyl-pentanediol-1,3, 2,3-dimethyl-butanediol-2,3 2-methyl-hexanediol-2,6, 3-methylol-hexanol-3, 3-ethyl pentanediol-2,3, 2,4-dimethyl-pentanediol-2,4, 2-methyl-heptanediol-2,6, 2,5-dimethyl-hexanediol-1,2, 2,2,4-trimethyl-pentanediol-1,3, 3-ethyl-hexanediol-3,6, 2,6-dimethyl-heptanediol-2,6, 2,2,5-trimethyl-hexanediol-1,3, 2-methyl-nonanediol-1,2, 3,4-diethyl-hexanediol-3,4, 2,2,5,5-tetramethyl-hexanediol-3,4 and the like.

In addition to the zinc stearate, one may make use of any of the other conventional lubricants, which are added to molding compositions. Still further, as incidental modifiers for the composition, one can make use of fillers other than wood flour, for instance, walnut shell flour, glass fibrous material and the like. The use of magnesium oxide in the formulation is to offset the acidity of the wood flour filler so that satisfactory curing rate can be obtained. Similar compounds, such as calcium oxide, and zinc oxide may also be used.

The resinous composition of the present invention should be dried to the point where the product has a plasticity of about 0.02 to 0.06 inch as determined by the following tests:

A charge of fifty grams of the material at 20°–30° C. is placed in the center of the bottom platen of a molding press, both platens of which are at a temperature of 290±2° F. and which are so shaped and grooved as to produce a flat molded disc with concentric ridges ½″ apart. The press is closed in 20 seconds and a force of 18 tons applied in 15 seconds and maintained during the cure time. At the end of the time required for cure, the piece is removed and cooled. The average measurement of the thickness taken in the ring about 2¼ inches from the center of the molded disc is recorded in mils or inches as a measure of the plasticity. For convenience, this testing of the plasticity or flow of the resin will be referred to as the "flow-mold-flow test."

The composition of the present invention may be prepared without incorporating therein any filler material if it is desired to make clear, unfilled molded articles. Still further, one can make use of various colorants such as pigments and dyes and, if one so wishes, one can add to the composition catalysts of the conventional type or latent catalysts in catalytic amounts.

In preparing the compositions of the persent invention, one should use about 2–15% of the flow promoters by weight based on the total weight of the urea and/or melamine resin solids. As a preferred embodiment, one should use about 5–10% by weight of the flow promoters based on the total weight of the urea and/or melamine resin solids.

We claim:

1. A composition of matter comprising a thermosetting resin selected from the group consisting of an urea-formaldehyde resin and a melamine-formaldehyde resin, and, as a flow-promoter therefor, 2–15% by weight of a dihydroxy alkane containing from 6–10 carbon atoms.

2. A composition of matter comprising a thermosetting urea-formaldehyde resin and, as a flow-promoter therefor, 2–15% by weight of a dihydroxy alkane containing from 6–10 carbon atoms.

3. A composition of matter comprising a thermosetting melamine-formaldehyde resin and, as a flow-promoter therefor, 2–15% by weight of a dihydroxy alkane containing from 6–10 carbon atoms.

4. A composition of matter comprising a thermosetting resin selected from the group consisting of an urea-formaldehyde resin and a melamine-formaldehyde resin and, as a flow-promoter therefor, 2–15% by weight of a dihydroxy alkane containing from 7–9 carbon atoms.

5. A composition of matter comprising a thermosetting urea-formaldehyde resin and, as a flow-promoter therefor, 2–15% by weight of 2-ethyl hexandiol-1,3.

6. A composition of matter comprising a thermosetting melamine-formaldehyde resin and, as a flow-promoter therefor, 2–15% by weight of 2-ethyl hexandiol-1,3.

TZENG JIUEQ SUEN.
ARTHUR M. SCHILLER.

No references cited.